United States Patent
Hall et al.

(10) Patent No.: US 10,895,492 B2
(45) Date of Patent: Jan. 19, 2021

(54) MONITORING SYSTEM FOR DETERMINING A VEHICLE SAFETY SETTING BASED ON WEIGHT

(71) Applicant: NewVistas Capital, LLC, Provo, UT (US)

(72) Inventors: David R. Hall, Provo, UT (US); Michael Hall, Provo, UT (US); Seth Myer, Eagle Mountain, UT (US)

(73) Assignee: Hall Labs LLC, Provo, UT (US)

( * ) Notice: Subject to any disclaimer, the term of this patent is extended or adjusted under 35 U.S.C. 154(b) by 135 days.

(21) Appl. No.: 16/209,851

(22) Filed: Dec. 4, 2018

(65) Prior Publication Data

US 2019/0178701 A1    Jun. 13, 2019

Related U.S. Application Data (60) Provisional application No. 62/594,281, filed on Dec. 4, 2017.

(51) Int. Cl.

| | |
|---|---|
| *G01G 19/03* | (2006.01) |
| *B60W 50/00* | (2006.01) |
| *B60W 50/14* | (2020.01) |
| *G01G 19/02* | (2006.01) |
| *G01G 19/12* | (2006.01) |
| *G01G 19/62* | (2006.01) |

(Continued)

(52) U.S. Cl.
CPC ........... *G01G 19/035* (2013.01); *B60W 10/06* (2013.01); *B60W 10/08* (2013.01); *B60W 10/18* (2013.01); *B60W 50/0098* (2013.01); *B60W 50/14* (2013.01); *G01G 19/024* (2013.01); *G01G 19/12* (2013.01); *G01G 19/4142* (2013.01); *G01G 19/62* (2013.01); *G01G 23/005* (2013.01); *B60W 2050/146* (2013.01); *B60W 2400/00* (2013.01); *B60W 2710/06* (2013.01); *B60W 2710/08* (2013.01); *B60W 2710/18* (2013.01); *G01G 23/3742* (2013.01)

(58) Field of Classification Search
CPC ... B60W 2530/10; B60W 40/13; B60D 1/248; G01G 19/086; G01G 19/12; G01G 23/36; G01G 19/024; G01G 19/035; G01G 19/08; G01G 19/62; G01G 23/005; B60T 2250/02

See application file for complete search history.

(56) References Cited

U.S. PATENT DOCUMENTS

6,459,367 B1 * 10/2002 Green .................... G08G 1/052
                                                      177/1
9,870,653 B1 *  1/2018 Fritz ........................ B60D 1/06
                            (Continued)

*Primary Examiner* — Kenneth J Malkowski (57) ABSTRACT

The invention is a monitoring system for determining a vehicle safety setting based on weight. The system includes a monitoring station, a weight determination system, a data input device configured to receive input data, and a processing device. The processing devices includes a processor and non-volatile memory. The processor is configured to receive load ratings for a tow vehicle and tow equipment, receive weight data from the weight determination system, and receive the input data from the data input device. The processor is also configured to determine at least one safety setting based on the load ratings, the weight data, and the input data, send the safety setting data to the monitoring system, and communicate the safety setting to a user.

18 Claims, 4 Drawing Sheets

(51) Int. Cl.
*B60W 10/08* (2006.01)
*B60W 10/18* (2012.01)
*B60W 10/06* (2006.01)
*G01G 19/414* (2006.01)
*G01G 23/00* (2006.01)
G01G 23/37 (2006.01)

(56) References Cited

U.S. PATENT DOCUMENTS

| | | | | |
|---|---|---|---|---|
| 2013/0046429 A1* | 2/2013 | Tashiro | ................ | B60W 20/40 |
| | | | | 701/22 |
| 2013/0253814 A1* | 9/2013 | Wirthlin | ................ | G01L 11/025 |
| | | | | 701/124 |
| 2015/0298706 A1* | 10/2015 | Hall | ................ | G01G 19/14 |
| | | | | 701/37 |
| 2018/0178797 A1* | 6/2018 | Seaman | ................ | G05D 1/0011 |

* cited by examiner

MONITORING SYSTEM FOR DETERMINING A VEHICLE SAFETY SETTING BASED ON WEIGHT

CROSS-REFERENCE TO RELATED APPLICATIONS

The present application is a continuation-in-part of U.S. Provisional Application No. 62/594,281, filed Dec. 4, 2017, entitled "Vehicle Warranty and Safety Monitoring (VWSM)". The entire disclosures of this prior application are incorporated by reference.

TECHNICAL FIELD

This invention generally relates to systems that determine vehicle safety settings and warranty compliance based on weight.

BACKGROUND

Many factors affect the safety and stability of a vehicle under various driving conditions. One of the factors that has a significant impact on the safety of a tow vehicle and trailer is the weight of the load(s) being hauled. Vehicle and equipment manufacturers normally provide weight ratings and recommendations for how a tow vehicle is connected to a trailer. Users may not know these ratings prior to hauling a load and may inadvertently overload the vehicle and/or the trailer. In some cases, other towing equipment such as the hitch may not be rated to handle a given load.

The weight being hauled by the vehicle has an impact on the structures and mechanical components of the vehicle. Exceeding the rated capacity of the vehicle may create a plethora of mechanical and structural problems that may significantly impact the safe operation of the vehicle, depending on how dramatic the rated capacity of the vehicle is being exceeded.

Currently, a monitoring company does not have any way to determine how much weight is being hauled by a vehicle. In many scenarios, a vehicle may be configured to tow a trailer. The amount of goods or other items being hauled in the trailer may vary from 100 kilograms or less, to many tons. The weight may have a significant effect on how the vehicle performs. Excessive weight may have long-term impacts on the engine, transmission and braking of the vehicle that may not be evidenced immediately. The vehicle may be able to handle excessive loads when it is new, however, over time the results of these overloads may create unsafe conditions.

Vehicle manufacturers provide ratings for maximum payload, towing, etc. for their products. However, there are no simple ways to determine if you are close to those limits without driving to a scale. The scale may be far away from the load site, where it would be impractical to weigh the vehicle. This takes extra time and cost in many cases. Very few drivers are typically motivated to weigh the vehicle once it has been loaded.

When there is excess weight being pulled by a tow vehicle, the operation of the vehicle is impaired. In some cases, unsafe conditions may be created by hauling heavy loads. The extra weight pulling on the back of a vehicle significantly hampers braking ability and steering control. When the back of a truck is loaded down, the front tires come up, causing them to lose some traction with the road. Without the front tires firmly on the ground, there is a negative impact on stability and handling. The truck's brakes, which were designed to stop a limited amount of weight, will either take much longer to slow the vehicle down in an emergency or they simply won't work at all.

Drivers of a vehicle may not know the manufacturer specifications, what the Society of Automotive Engineers recommends, or how much weight a vehicle can actually handle. A driver may not be motivated to consult the vehicle's owner's manual or check the SAE's J2807 towing recommendations prior to loading a vehicle.

Before towing any sort of load, a truck, trailer, hitch, and everything else that plays a vital role in completing the job safely must be known. It's guaranteed that towing more weight than the manufacturer's GCWR will raise operating temperatures. Many vehicles have gauges or other methods to check or monitor EGT, engine oil, coolant, transmission, and even axle temperatures. However, most vehicles do not have on-board weight measuring equipment to assist during the loading of a vehicle or trailer in determining if and when a load begins to exceed specifications.

Checking that hitch capacity matches (or exceeds) the load to be pulled is also essential, as is knowing the maximum weight the truck's factory suspension is rated to handle. Running maximum air pressure in tires rated to withstand extreme loads should be utilized in conjunction with wheels that have a high maximum load rating. All equipment associated with towing the weight, both on the vehicle and the trailer may have excessive wear and potential failure if the weight exceeds specifications.

There's a plethora of mechanical problems that may occur when towing a load that exceeds a vehicle's listed capacity. It may be possible to overload a truck, trailer or other towing equipment beyond its capacity a few times and still have them function properly, however over time the result of these overloads will be exhibited in the form of mechanical problems which may result in unsafe driving conditions.

Without a method of determining the weights of the loads along with how these weights impact safety of a given tow set-up, it is difficult for the user or driver to confirm that a given set-up is safe for a specific set-up. It is also not normally known by an equipment manufacturer or equipment rental company if a user has overloaded a vehicle or tow equipment with loads that are higher than the ratings of the equipment.

Therefore, a method is needed to determine the vehicle and trailer weights, communicate the weight information to a monitoring station, and communicating the weight data and safety settings to the user, to the manufacturer for warranty issues, to the equipment rental company, and to the insurance company for rate adjustments based on overloads or equipment set-ups that may not be safe.

SUMMARY

In one aspect, the invention is a monitoring system for determining a vehicle safety setting based on weight. The system includes a monitoring station, a weight determination system, a data input device configured to receive input data, and a processing device. The processing devices includes a processor and non-volatile memory. The processor is configured to receive load ratings for a tow vehicle and tow equipment, receive weight data from the weight determination system, and receive the input data from the data input device. The processor is also configured to determine at least one safety setting based on the load ratings, the weight data, and the input data, send the safety setting data to the monitoring system, and communicate the safety setting to a user.

In a preferred embodiment, the monitoring system may communicate safety settings to a monitoring station and to a user. The monitoring system may automatically set safety settings or adjust user selected settings based on weight. The system may further enable automatic adjustments to a vehicle's drive modes or other operational systems within a vehicle and associated equipment to be made based on the weight and the safety settings of the vehicle including trailer weight if applicable. The system may inform the control systems that control the operation of the vehicle regarding weight so that adjustments to driving characteristics related to safety may be made. The system may further enable automatic adjustments to a vehicle's control settings or other vehicle systems that impact safety within a vehicle to be made based on the weight and safety settings. The system may further build a model of these adjusted safety settings for the tow vehicle and the trailer if applicable.

Features and advantages of different embodiments of the invention will become more fully apparent from the following description and appended claims or may be learned by practice of the invention as set forth hereinafter.

Consistent with the foregoing, a monitoring system for determining vehicle safety based on weight is disclosed. The objectives of the system are to enable automatic adjustments to a vehicle's drive modes or other operational systems within a vehicle and associated equipment to be made based on the weight of the vehicle including trailer weight if applicable. The system informs the control systems that control the operation of the vehicle regarding weight so that adjustments to driving characteristics including performance and energy use may be made. The system may further enable automatic adjustments to a vehicle's emissions control settings or other vehicle systems that impact emissions within a vehicle to be made based on the weight. Additional objectives include the ability of the system to build a model of the tow vehicle and the trailer.

In a preferred embodiment, a monitoring system for determining vehicle safety based on weight may include a monitoring station, a weight determination system, a data input device configured to receive input data along with a processing device comprising a processor and non-volatile memory. The processor may be configured to receive weight data from the weight determination system and receive the input data from the data input device. The system may then determine at least one safety setting based on the load ratings, the weight data, and the input data. The safety setting data may then be sent to the monitoring station and communicated to a user. In some cases, the user may select user defined settings via a user input device. The system may then modify the user selected settings based on the weight.

In an embodiment, the weight data may include vehicle weight. In another embodiment, the weight data may also include trailer weight. In a certain embodiment, the system may also include one or more sensors that may produce sensor data. The sensors may convert sensor data to an electrical signal and may include at least one sensor type of: electromagnetic; electrochemical; electric current; electric potential; magnetic; radio; air flow; accelerometers; pressure; electro-acoustic; electro-optical; photoelectric; electrostatic; thermoelectric; radio-acoustic; environmental; moisture; humidity; fluid velocity; position; angle; displacement; or combinations thereof.

In another embodiment, the monitoring system may determine an overload condition based on loads in the tow vehicle and the tow equipment that are over the load ratings. The monitoring system may also determine a rating for insurance and safety based on the overload condition. The monitoring system may further determine a rating for a manufacturer warranty based on the overload condition.

In certain embodiments, the monitoring system may send at least one control command to a vehicle control system, controlling the operation of the tow vehicle based on the determined safety settings. The monitoring system may also send at least one control command to a hybrid vehicle control system, controlling the operation of the tow vehicle's electric motor and internal combustion engine based on the determined safety settings.

In one embodiment, the monitoring system may send a control command to a vehicle braking system, controlling braking force delivered to brakes based on the determined safety settings. In an embodiment, the input device may be an OBD device connected by a plug-in connector to a vehicle OBD port. In another embodiment, the system may send a control command to a vehicle computer server.

In an embodiment, the input device may receive and transmit data via a wireless interface. The wireless interface may utilize a protocol of a Bluetooth, Bluetooth mesh, WIFI, NFC, RFID, BLE, ZigBee, Z-wave, LoRaWAN, Dash7, DigiMesh, ANT, ANT+, NB-IoT, 3G, 4G, 5G, LTE or combinations thereof.

In a certain embodiment, the processor is configured to build a model of a set-up for a specific vehicle connected to a specific trailer. The model may determine a safety mode based on the data associated with the set-up for the model. The model may be stored in the non-volatile memory, and the system may communicate the safety mode for the model to the vehicle control system. The system may then alert the user to the safety mode for the model. The non-volatile memory may store factory settings and user settings specific to the model.

In an embodiment, the system may also include a cloud-based network. Factory settings, the user settings and the sensor data may be stored in the memory of the cloud-based network. The cloud-based network processor may also be configured to determine set-up specific safety settings for a specific towing set-up of tow vehicle, trailer and all associated tow equipment, and may transmit the set-up specific drive mode settings to the system based on the sensor data, the factory settings, and the user settings.

In certain embodiments, the data input device may include a cell phone, satellite phone, smartphone, personal digital assistant, tablet computer, laptop computer, remote control device, mobile transmitter, a mobile internet device or a combination of one or more of the same.

In one embodiment, the system may also monitor, via the sensors, behavior of a vehicle and its components while driving on a specific trip. The system may then make adjustments to the safety mode and the model for the specific trip based on the specific trip sensor data and input data. This data may then be stored in the non-volatile memory. An adjusted safety mode model may then be determined based on the adjustments. This adjusted model may then be used for the specific trip and stored in the memory for use on future trips. In one example, a user may start a new trip in the future and the system may receive input data indicating a new set-up for this new trip. The system may determine that this new set-up matches or is similar to one of these stored adjusted safety mode models. In this example, the stored adjusted safety mode model may be determined to be the best for this new set-up. The adjusted safety mode may be communicated to the monitoring station.

In some cases, the driver may select settings that may be unsafe while hauling heavy loads. For example, a truck may be pulling a trailer and the driver may select a certain drive mode such as "tow" mode thinking that more power is needed. However, this may not be a safe setting based on the load. Based on the weight detected by the weight determination system, the settings selected by the driver may be modified or altered in order to assure that the safest settings are used to operate the vehicle, thus allowing the driver to safely pull the trailer. In certain embodiments, the system may alert the driver to these changes in drive mode settings, and that a custom drive mode has been developed and implemented. These changes may then be communicated to the monitoring station.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

The Vehicle Warranty and Safety Monitoring (VWSM) provides a way for a monitoring company (MC) to monitor and determine vehicle weight, and how the weight of the vehicle influences vehicle safety. A monitoring company may also be called a monitoring station. Weight information from an on-board weight determination system may inform the VWSM regarding vehicle weight and if the weight is within manufacturer's specifications. The MC may be an insurance company that insures the vehicle or the people (passengers and driver) inside the vehicle. The VWSM continuously monitors and measures the weight of the vehicle, including weight being hauled in the vehicle and weight being towed such as a trailer. This weight data is reported to the MC to allow ratings to be established based on use.

The weight being hauled by the vehicle has an impact on the structures and mechanical components of the vehicle. Exceeding the rated capacity of the vehicle may create a plethora of mechanical and structural problems that may significantly impact the safe operation of the vehicle, depending on how dramatic the rated capacity of the vehicle is being exceeded.

Currently, a MC does not have any way to determine how much weight is being hauled by a vehicle. The VWSM continuously monitors and measures the weight of the vehicle including weight being hauled in the vehicle along with weight being towed by the vehicle. The VWSM stores this historic weight information in memory and also transmits weight data in real-time via wireless, cellular or satellite radio on board the vehicle.

In many scenarios, a vehicle may be configured to tow a trailer. The amount of goods or other items being hauled in the trailer may vary from 100 kilograms or less, to many tons. The weight may have a significant effect on how the vehicle performs. Excessive weight may have long-term impacts on the engine, transmission and braking of the vehicle that may not be evidenced immediately. The vehicle may be able to handle excessive loads when it is new, however, over time the results of these overloads may create unsafe conditions.

Vehicle manufacturers provide ratings for maximum payload, towing, etc. for their products. However, there are no simple ways to determine if you are close to those limits without driving to a scale. The scale may be far away from the load site, where it would be impractical to weigh the vehicle. This takes extra time and cost in many cases. Very few drivers are typically motivated to weigh the vehicle once it has been loaded.

When there is excess weight being pulled by a tow vehicle, the operation of the vehicle is impaired. In some cases, unsafe conditions may be created by hauling heavy loads. The extra weight pulling on the back of a vehicle significantly hampers braking ability and steering control. When the back of a truck is loaded down, the front tires come up, causing them to lose some traction with the road. Without the front tires firmly on the ground, there is a negative impact on stability and handling. The truck's brakes, which were designed to stop a limited amount of weight, will either take much longer to slow the vehicle down in an emergency or they simply won't work at all.

Drivers of a vehicle may not know the manufacturer specifications, what the Society of Automotive Engineers recommends, or how much weight a vehicle can actually handle. A driver may not be motivated to consult the vehicle's owner's manual or check the SAE's J2807 towing recommendations prior to loading a vehicle.

Many of the ¾-ton and 1-ton diesel trucks on the market today may be overkill for the average towing duties. With stronger frames, stouter suspensions, and more power from the factory than ever before, most trucks may handle significant loads. However, in order to transport some serious weight, the vehicle's advertised gross combined weight rating (GCWR) should be known, in addition to the proper equipment to tow safely.

Before towing any sort of load, a truck, trailer, hitch, and everything else that plays a vital role in completing the job safely must be known. It's guaranteed that towing more weight than the manufacturer's GCWR will raise operating temperatures. Many vehicles have gauges or other methods to check or monitor EGT, engine oil, coolant, transmission, and even axle temperatures. However, most vehicles do not have on-board weight measuring equipment to assist during the loading of a vehicle or trailer in determining if and when a load begins to exceed specifications.

Checking that hitch capacity matches (or exceeds) the load to be pulled is also essential, as is knowing the maximum weight the truck's factory suspension is rated to handle. Running maximum air pressure in tires rated to withstand extreme loads should be utilized in conjunction with wheels that have a high maximum load rating. All equipment associated with towing the weight, both on the vehicle and the trailer may have excessive wear and potential failure if the weight exceeds specifications.

There's a plethora of mechanical problems that may occur when towing a load that exceeds a vehicle's listed capacity. It may be possible to overload a truck, trailer or other towing equipment beyond its capacity a few times and still have them function properly, however over time the result of these overloads will be exhibited in the form of mechanical problems which may result in unsafe driving conditions.

The objectives of the VWSM include providing a way for a MC to monitor and determine the weight being hauled by a vehicle. This weight data informs both the driver and the MC regarding the weight of the vehicle including trailer weight, and how this weight impacts the safe driving of the vehicle. The VWSM may provide detailed data regarding the weight of the vehicle and how this weight affects various vehicle components and systems. Brakes, suspension systems, engine, drivetrain and associated mechanical parts and systems of the vehicle may be monitored by the VWSM and reported to the driver and the MC. Weight of a trailer being towed by the vehicle and associated tow equipment may also be communicated by the VWSM.

The weight of the vehicle may be monitored continuously and either communicated in real-time to the driver and the MC, or recorded in the memory of the VWSM for periodic download by the MC. By knowing the ratings of their equipment, the MC may assist drivers in determining whether a load is safe to tow. The MC may also rate the driver or vehicle based on weight.

The VWSM utilizes on-board weight sensing devices or equipment to determine vehicle and trailer weight in order to inform the MC. The data is communicated to the MC which may in turn determine whether the load being hauled by the vehicle is safe. This information may be used to determine ratings for the vehicle for insurance purposes. For example, the MC may be an insurance company that insures the vehicle against damage. If a vehicle is used in a way that is outside the bounds of a manufacturer's recommendations (specifications for loading of the vehicle, i.e. weight limits)

In an embodiment, the MC may be a manufacturer of one or more parts on the vehicle (i.e. a tire manufacturer). The warranty for the tires may be based on normal use (within manufacturer's recommendations or specifications). If the vehicle is towing a weight that exceeds these specifications, the MC may notify the driver that the load is too heavy. The driver may choose to go ahead and drive the overloaded vehicle, and in this case the manufacturer may then reduce the warranty period of the tires. Since the tires were not designed to be overloaded, the warranty period may be shortened according to how far beyond the manufacturer's warranty the tires have been misused. This change in warranty coverage may be on a scale that reduces the time period of coverage or may in extreme cases actually void the warranty (for example, in a case where the load is so heavy that it actually compromises the integrity of the tire material causing a blow-out). The VWSM monitors and reports the weight of the vehicle to the MC so that these warranty determinations may be made.

In other embodiments, the MC may be the manufacturer of the vehicle. In a case where the vehicle is designed to tow loads such as a truck, the manufacturer may have recommended weight limits or specifications that identify how much weight, and how the weight is to be hauled. Regarding the "how" the weight is hauled includes how a truck is attached to a trailer for example. If a trailer is not attached to the truck properly, it may damage the truck or the attachment components and may create an un-safe condition for towing. This unsafe condition, if not identified prior to driving the vehicle, may cause damage to the vehicle while driving, damage to the trailer, and potentially cause an accident putting the driver, passengers and potentially other vehicles on the roadway at risk. The VWSM may notify the driver that the load being hauled is too heavy. Information regarding how this will affect insurance rates (higher rates for heavy loads) may be communicated to the driver via the VWSM user interface. This interface may be on-board the vehicle in an OEM implementation, via a mobile device or via an after-market device inside the vehicle. Communication regarding changes in insurance rates based on loads that are too heavy may be communicated in real-time to the driver by the VWSM. This allows the driver to make adjustments to the load prior to driving the vehicle in order to avoid any limits or modifications to the warranty coverage. This also allows the driver to make good decisions regarding the safety of the vehicle and its occupants.

In one embodiment, the MC may be a work safety organization. The safe practices for vehicle use and best practices for towing based on the safety organizations standards may be assured by information provided by the VWSM. This information may also be communicated to the driver so that the driver may make adjustments to the load when the VWSM communicates that certain safety standards are being exceeded.

In another embodiment, the MC may be an insurance company that insures the health and safety of people or individuals in the vehicle. For example, the driver of the vehicle may be insured against injury while driving the vehicle. In cases where the vehicle may be overloaded, the driver and any passengers may be at a higher risk of injury due to the overloading. Injury and, in extreme cases, even death may occur due to weight being hauled in the tow vehicle or trailer weight exceeding recommended limits. The MC may notify the driver to adjust loads prior to driving under overloaded conditions.

In certain embodiments, the VWSM monitors the weight of a vehicle and its associated equipment. This equipment may include a trailer, hitch and other components that may be affected by the weight loaded onto the vehicle or trailer. For example, if very heavy weights are loaded into the bed of a truck, the excessive weight may actually exceed the ratings of the truck. Normally, the MC may not know that the truck is being overloaded. The VWSM may monitor the actual weight being loaded and transmit this information to the MC. In some cases, the MC may have a sliding scale of weights that are allowed for specific vehicles. When certain weight limits are exceeded, the MC may assess a fee for each range of weights that are above the recommended weight limits.

In another embodiment, weight data is relayed in real-time, so that the MC has the option of notifying the driver that the load is more than the truck is rated for. In certain embodiments, the MC may send notifications to the driver in real-time indicating that the weight exceeds the rating of the vehicle. This communication may include indicting what the added fees are for the excessive weight. The driver then has the option to reduce the weight to avoid the higher fees (splitting the load into two trips for example).

In some embodiments, the VWSM may monitor via sensors or other system devices or components, other vehicle components such as the brakes or suspension system. Excessive weight may influence the behavior of the suspension system or braking system. The engine may also be affected by excessive weight. Data relating to these systems in response to the excess weight may be communicated to the MC.

The range of allowable weights may be communicated to the driver in real-time, allowing the driver to make adjustments prior to being charged extra for overages. In some cases, the driver may choose to exceed even the highest allowable weight limits. In cases where the overage is not detected until the vehicle is already in motion, the VWSM may send audible and visual alerts to the driver that weight limits have been exceeded prior to any control actions.

In addition to reporting how weight affects components of the vehicle, the VWSM may also monitor the weight of trailers and associated towing equipment attached to the vehicle. For example, in some cases the driver may use their own vehicle to tow a trailer provided by the MC. In this case, the trailer may have sensors and devices that monitor the weight of the trailer and its load. In this way, the MC may be able to monitor the trailer weight and determine if this weight exceeds limits. Other equipment related to the towing may also be monitored. In some cases, the weight of the trailer may be within limits, however the weight on the hitch (tongue weight) may exceed specifications. In this case, the MC may alert the driver that the load on the trailer may need to be adjusted to reduce the tongue weight on the hitch. This alert may be automatically communicated to the driver via an app on their phone or mobile device.

The VWSM consists of software and/or firmware and other equipment or systems that enable the hardware and systems in a tow vehicle and/or in a trailer to determine the weight of the vehicle, trailer, and associated tow equipment. Data regarding weight data along with sensor data is communicated to the MC. Both real-time and historical data is recorded and relayed to the MC. The data may be sent wirelessly via a local network or a cloud network.

The VWSM may include one or more of the following components:
 1. Software
 2. Firmware
 3. Hardware
 4. Sensors—electrical, electro-mechanical, automotive, chemical, navigational, thermal
 5. Accelerometers
 6. Processor
 7. Controller or microcontroller
 8. Memory or other data storage device or module
 9. Wireless network device
 10. Mobile device The basic process of how the VWSM is used or implemented is as follows:

A user or MC representative opens the VWSM app on a mobile device (or app "on-board" vehicle for OEM implementation) that prompts the user to indicate equipment included in the system. If the equipment included is a trailer, for example, the user is prompted to indicate that the trailer is part of the system and to include the trailer and its weight. In some embodiments, the trailer and its weight are recognized by the VWSM automatically so that no user interface is required. In other embodiments, the VWSM is automatically started every time the vehicle is driven and communicates to the vehicle control system the weight of the loads (both loads in the bed of a truck, for example along with the trailer weight). In certain embodiments, the VWSM includes sensors that recognize when equipment like a trailer is connected to the truck, and starts tracking the weight of the trailer as soon as it is hooked up.

In certain embodiments, the MC may send alerts to the driver in real-time while driving indicating that loads are too high, along with the additional charges associated with these overloads. The rate increases are thus known during the overloading event, and the driver may take action to adjust the loading. The safety of the vehicle and its occupants may likewise be assured by adjusting the load.

In certain embodiments, the VWSM may be implemented directly into the vehicle in a factory or OEM application. In other embodiments, the VWSM may be retrofitted to an existing vehicle. In a retrofit application, the VWSM may plug into the vehicle's OBD port to allow interface with the vehicle's control system. Alternatively, it may be connected wirelessly either via a wireless adapter to the OBD, or to other wireless interface devices that connect the VWSM to the vehicle's control systems.

In some embodiments, the VWSM may also be connected to other equipment attached to the vehicle. For example, a trailer may have sensors and allow control (trailer brakes) that may inform the VWSM. In this case, the VWSM may be connected to this equipment either by a hard-wire connection (via the trailer wiring connection to the vehicle) or wirelessly via wireless equipment mounted on the equipment and within the VWSM. In this way, further data regarding the behavior of a trailer may be learned by the VWSM through this connection to its sensors. Control of the equipment (application of the braking system for example) may also be done by the VWSM. The electrical trailer brake gain signal for example may be adjusted by the VWSM based on the load of the trailer. Information regarding pitch and roll of the trailer may also be communicated to the VWSM by sensors on the trailer. This information may be communicated to the driver and to the MC.

The VWSM may also interface with autonomous or semi-autonomous vehicles, informing the control system regarding weight and the impact that weight has on the vehicle and its systems.

In certain embodiments, the VWSM may be implemented via a local or cloud-based network. The local network may comprise the vehicle, trailer and all associated tow equipment with a specific towing set-up. For example, each component and part of the towing system (vehicle, trailer, hitch, etc.) may have a wireless network device that links them together. In this way, the VWSM may communicate with all of the equipment in order to effectively monitor (via sensors) and control not only the vehicle but also the tow equipment.

In other embodiments, the VWSM may further comprise connection to a cloud network. For examples, user profiles, drive mode profiles, vehicle profiles, and system settings may be stored and accessed via a connection to the cloud. This connection may be via wireless devices or transmitter and receivers. In some embodiments, both monitoring and control of the VWSM may also be done via the cloud.

A mobile device may also be used for a user interface with the VWSM. In some cases, the processor in a mobile device along with other VWSM components may be comprised within the mobile device, and the mobile device may interface with the vehicle via a wireless connection. The mobile device may allow for user data or changes to the factory presets to be entered in. The mobile device may also be used as a scanner to scan in equipment ID's to identify the specific equipment being used.

In another embodiment, the user interface with the VWSM may be via the vehicle's infotainment system or other interface device on the dashboard of the vehicle.

Figure 1:
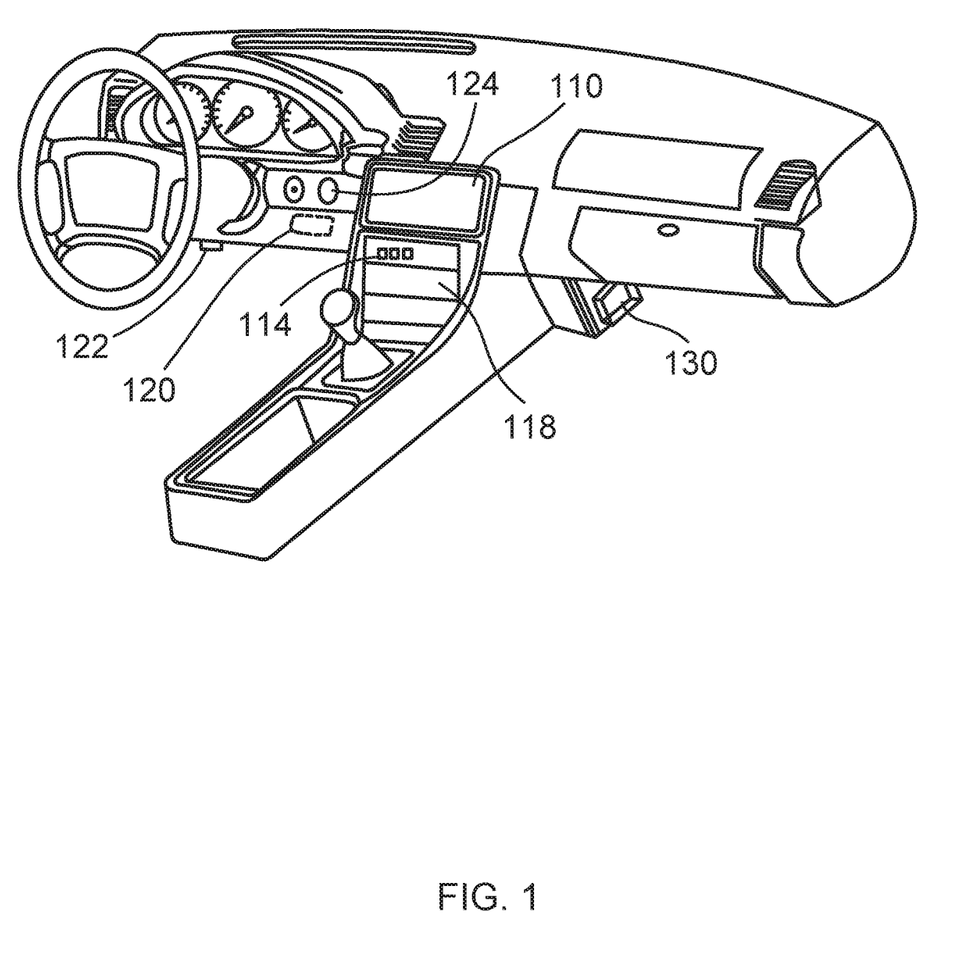
FIG. 1 is a perspective view of a car dashboard, steering wheel and shifter.

FIG. 1 is an illustration depicting a car dashboard, steering wheel and shifter. The monitoring system 120 for determining vehicle safety based on weight is shown behind the dashboard near the steering wheel. In some embodiments, the system 120 is an OEM product incorporated into the vehicle at the time of manufacture. In other embodiments, the system 120 may be connected to the vehicle via the OBD port 122 as an after-market component. In one embodiment, the OBD connector may have a wireless connection to the system. In another embodiment, the system may be plugged into the OBD port 122 with a wired connector.

In another embodiment, an after-market wireless device 130 may be attached to the vehicle. The vehicle may have a tow/haul button 124 on the dash of the vehicle. Other user interface devices may include an infotainment system 118, vehicle control system user interface buttons 114, or user interface panel 110. The purpose of these interface devices is to provide one or more methods for the user or driver to input settings, or to communicate to the monitoring system. The interface devices also provide a way for the system to communicate safety settings and to alert the driver to changes in the safety settings or additional conditions detected by the system that require user intervention.

For example, the driver or user may push a button on the dash for "tow/haul", knowing that they are pulling a trailer. The system may then determine the best safety settings for towing a load. The system may further adjust various system settings as needed to accommodate this added load. The braking system may be adjusted to apply more pressure to the brakes as required for the added load. The brake gain signal to the trailer may also be adjusted to match requirements for that specific trailer load. In some cases, the trailer load may be significantly higher than the tow vehicle load and may require more braking pressure than the tow vehicle. In this scenario, since the weights of both the tow vehicle and trailer are known by the on-board weight determination system, the system may then inform the braking system to apply the necessary braking to each of the brake components. In certain embodiments, sensor data may indicate different tire air pressure for each wheel and associated brake for that wheel. In order to improve safety in handling, the system may select a different braking setting for the wheel associated with the low air pressure tire. The system may further alert the driver to this occurrence along with how the safety settings were adjusted to compensate. These settings may be communicated to the monitoring station.

The monitoring station may determine that either the tow vehicle or trailer is in an overload condition that exceeds the ratings of the vehicle, trailer or associated tow equipment. The monitoring system may communicate these overload conditions to the user or driver of the vehicle. The user may then make adjustments to the load (i.e. remove some of the load to reduce the weight) in order to not exceed the ratings. In cases where the user does not make adjustments to the weight after this overload warning, the monitoring station may alert the manufacturer regarding warranty issues and may further alert an insurance company. Insurance rates may be adjusted (increased typically) because of the overloading condition. This information (higher insurance rates and voiding the warranty) may be communicated to the driver. In some cases, the user may be renting a trailer or truck from a rental company. The monitoring system may communicate to the user that overloads to the equipment (including tow equipment) may increase the rental rate. The monitoring station may further send commands to a vehicle control system that disables the vehicle in cases where the overload may seriously damage the vehicle or potentially cause harm to people in the vehicle.

Figure 2A:
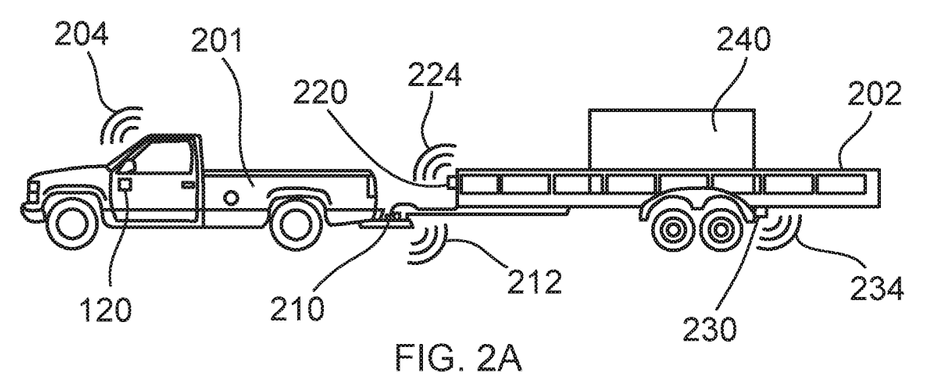
FIG. 2A is a side view of a truck pulling a flatbed trailer.

FIG. 2A is an illustration depicting one scenario demonstrating how the monitoring system 120 may be implemented for a specific truck pulling a flatbed trailer. System 120 may communicate via wireless signal 204. Truck 201 is shown hauling flatbed trailer 202. Trailer type and weight may be communicated by wireless device 220, and load 240 may be communicated to the system 120 via trailer wireless signal 224. Tongue weight may be determined by sensor 210 and communicated via wireless signal 212. Axle weight may be determined by sensor 230 and communicated via signal 234.

Figures 2B, 2C:
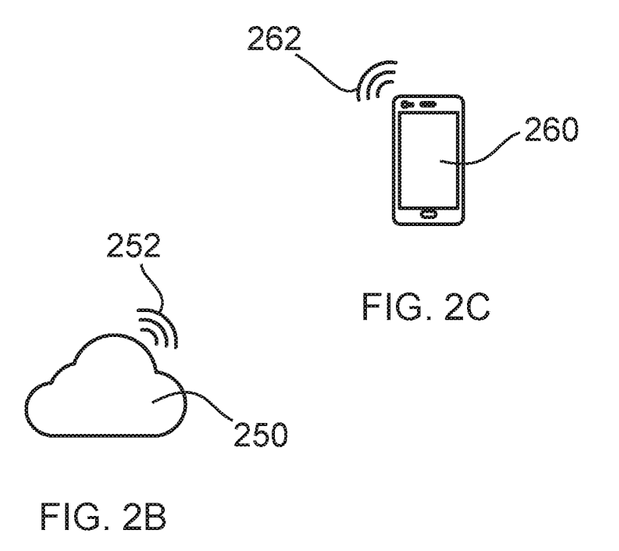
FIG. 2B shows a cloud network communicating via wireless signal.
FIG. 2C illustrates a mobile app on a mobile device.

FIG. 2B shows a cloud 250 network communicating via wireless signal 252. The cloud may communicate to the system to store safety settings as a back-up for any memory loss to the vehicle mounted system components. System components may be redundantly included in the cloud, on the vehicle system component and on a mobile device. In this way, various system components that may be damaged or otherwise rendered inactive for any reason may be backed up by these redundant system components. For example, if a vehicle's computer or control system is damaged, a complete copy of all settings may be re-installed into a new replacement computer or control system. All relevant data and information including modeling for each set-up are communicated to the cloud 330. All settings, manufacturers ratings, set-ups and user input data may be stored in the cloud. In some embodiments, set-up information may be retained in the cloud and downloaded to the system after a system failure, or data loss.

FIG. 2C illustrates a mobile app on the mobile device 260 shown. In this embodiment, the monitoring system is on the mobile device and all interface between the tow vehicle and trailer is done wirelessly via signal 262.

Figure 2D:
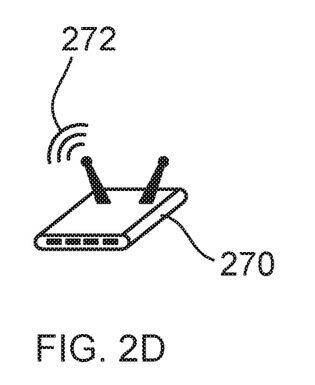
FIG. 2D is an illustration of a wireless hub device.

FIG. 2D is an illustration of a wireless hub 270, which may function as a bridge or connecting device to a network. Wireless signal 272 may connect the hub 270 to the monitoring system.

Figures 3A, 3B, 3C:
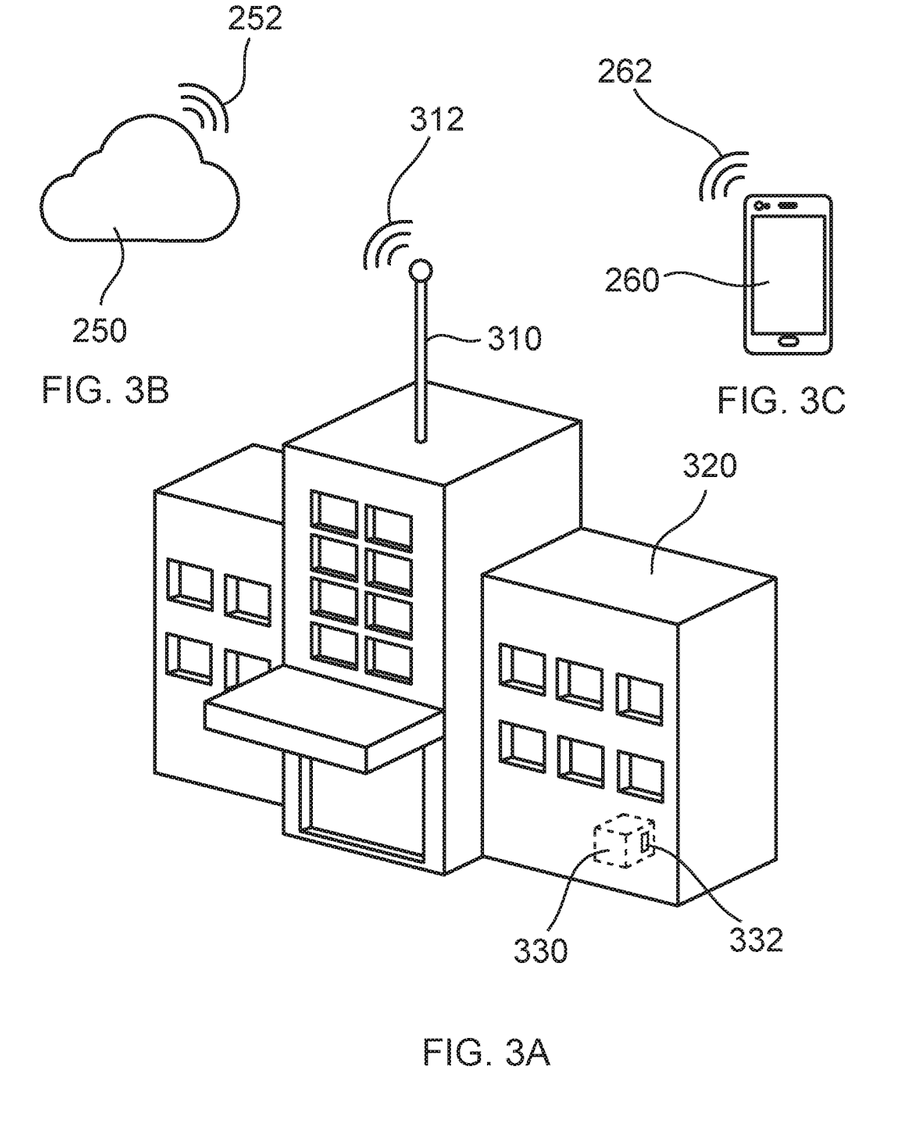
FIG. 3A is a perspective view of a monitoring station.
FIG. 3B shows a cloud network communicating via wireless signal.
FIG. 3C illustrates a mobile app on a mobile device.

FIG. 3 is a perspective view of a monitoring station 320 with antenna 310 that facilitates transmission of communication signal 312 to the monitoring system. In certain embodiments, the monitoring station 320 communicates to the monitoring system via the cloud 250 and wireless signal 252. Communication to the user may be received via wireless signal 262 to mobile device 260.

Figure 4:
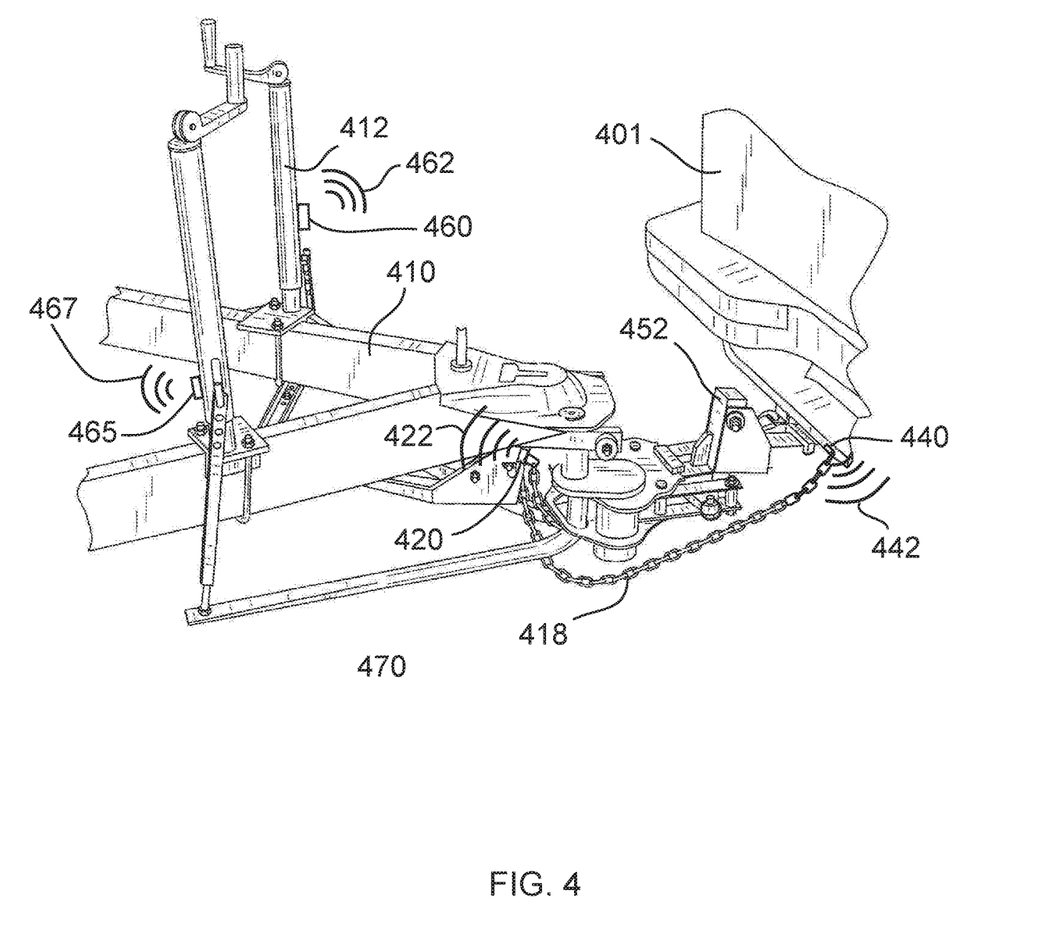
FIG. 4 is an illustration of a trailer hitch connected to the back of a truck.

FIG. 4 is an illustration of a trailer hitch connected to the back of a truck 401. Truck 401 has a receiver hitch 452 which is connected to trailer 410. In this embodiment, the receiver hitch 452 has a wireless device 440 for communication of data to the monitoring system. The trailer 410 also has a wireless transmission device 420. The monitoring system may automatically request notification from wireless device 440 via wireless signal 442, and wireless device 420 via wireless signal 422 as the trailer is hooked up. In some embodiments, device 440 may also include a sensor indicating that the chains 418 have been connected. The data informing the system may also include this chain connection data to assure that the safety chains 418 are in place before driving off. In a similar manner, jacks 412 may include sensors 460 and 465 that transmit signals 462 and 467 to the monitoring system alerting the system that the jacks are fully seated and in the correct position. In certain embodiments, jacks 412 and 413 may adjust anti-sway or stabilizer bars. The proper settings for this equipment may be communicated to the monitoring system. Any deviations from the correct set-up may be communicated to the user and to the monitoring station. The user may then have the option to make adjustments to the set-up to bring it into compliance with the recommended settings and equipment ratings before operating the vehicle.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A monitoring system for determining a vehicle safety setting based on weight, comprising:
a monitoring station;
a weight determination system;
a data input device configured to receive input data;
a processing device comprising a processor and non-volatile memory;
wherein the processor is configured to:
receive load ratings for a tow vehicle and tow equipment;
receive weight data from the weight determination system;
receive the input data from the data input device;
determine at least one safety setting based on the load ratings, the weight data, and the input data;
send the safety setting to the monitoring station; and
communicate the safety setting to a user;
wherein the input device further comprises:
one or more sensors; wherein the one or more sensors produce sensor data;
wherein the processor is configured to build a model of a set-up for a specific vehicle connected to a specific trailer;
wherein the model determines at least one safety mode based on the data associated with the set-up for the model;
wherein the model is stored in the non-volatile memory;
wherein the monitoring system receives user settings;
wherein the monitoring system communicates the safety settings for the model to the vehicle control system; and
wherein the monitoring system alerts the user to the safety settings for the model.

2. The monitoring system of claim 1, wherein the weight data comprises vehicle weight.

3. The monitoring system of claim 2, wherein the weight data further comprises trailer weight.

4. The monitoring system of claim 1, wherein the monitoring system determines an overload condition based on loads in the tow vehicle and the tow equipment that are over the load ratings.

5. The monitoring system of claim 4, wherein the monitoring system determines a rating for insurance and safety based on the overload condition.

6. The monitoring system of claim 4, wherein the monitoring system determines a rating for a manufacturer warranty based on the overload condition.

7. The monitoring system of claim 1, wherein the monitoring system sends at least one control command to a vehicle control system, controlling the operation of the tow vehicle based on the determined safety settings.

8. The monitoring system of claim 1, wherein the monitoring system sends at least one control command to a hybrid vehicle control system, controlling the operation of the tow vehicle's electric motor and internal combustion engine based on the determined safety settings.

9. The monitoring system of claim 1, wherein the monitoring system sends at least one control command to a vehicle braking system, controlling braking force delivered to brakes based on the determined safety settings.

10. The monitoring system of claim 1, wherein the input device is an OBD device connected by a plug-in connector to a vehicle OBD port.

11. The monitoring system of claim 1, wherein the monitoring system sends at least one control command to a vehicle computer server.

12. The monitoring system of claim 1, wherein the input device receives and transmits data via a wireless interface.

13. The monitoring system of claim 12, wherein the wireless interface utilizes a protocol of at least one of a Bluetooth, Bluetooth mesh, WIFI, NFC, RFID, BLE, ZigBee, Z-wave, LoRaWAN, Dash7, DigiMesh, ANT, ANT+, NB-IoT, 3G, 4G, 5G, LTE or combinations thereof.

14. The monitoring system of claim 1, wherein the non-volatile memory stores factory settings and user settings specific to the model.

15. The monitoring system of claim 1, wherein the monitoring system further comprises a cloud-based network;
 wherein factory settings, the user settings and the sensor data are stored in the memory of the cloud-based network;
 wherein the cloud-based network processor is configured to:
  determine set-up specific safety settings for a specific towing set-up of tow vehicle, trailer and all associated tow equipment; and
  transmit the set-up specific safety settings to the monitoring system based on the sensor data, the factory settings, and the user settings.

16. The monitoring system of claim 1, wherein the data input device comprises a cell phone, satellite phone, smartphone, personal digital assistant, tablet computer, laptop computer, remote control device, mobile transmitter, a mobile internet device or a combination of one or more of the same.

17. The monitoring system of claim 1, wherein the sensors convert sensor data to an electrical signal; and wherein the sensors comprise at least one of: electromagnetic; electrochemical; electric current; electric potential; magnetic; radio; air flow; accelerometers; pressure; electro-acoustic; electro-optical; photoelectric; electrostatic; thermoelectric; radio-acoustic; environmental; moisture; humidity; fluid velocity; position; angle; displacement; or combinations thereof.

18. The monitoring system of claim 1, wherein the monitoring system further:
 monitors, via the sensors, behavior of a vehicle and its components while driving on a specific trip;
 makes adjustments to the safety mode and the model for the specific trip based on the specific trip sensor data and input data; and
 stores, in the non-volatile memory, an adjusted safety mode model based on the adjustments.

\* \* \* \* \*